July 11, 1939.  A. W. ENGEL  2,165,790
LABEL AND MARKER FOR LANTERN SLIDES
Filed Aug. 15, 1938
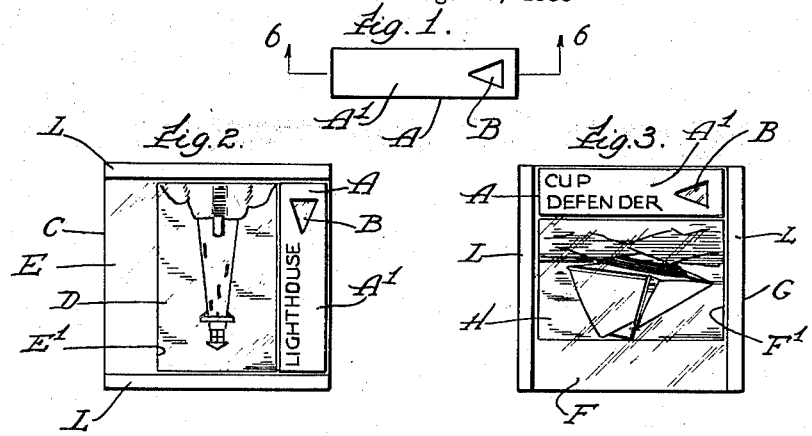
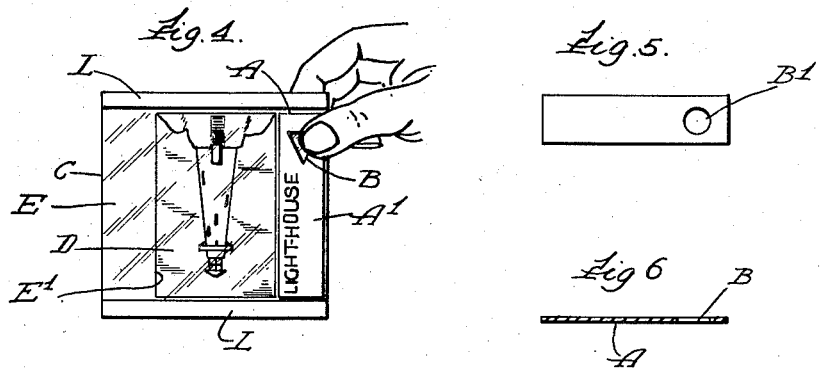
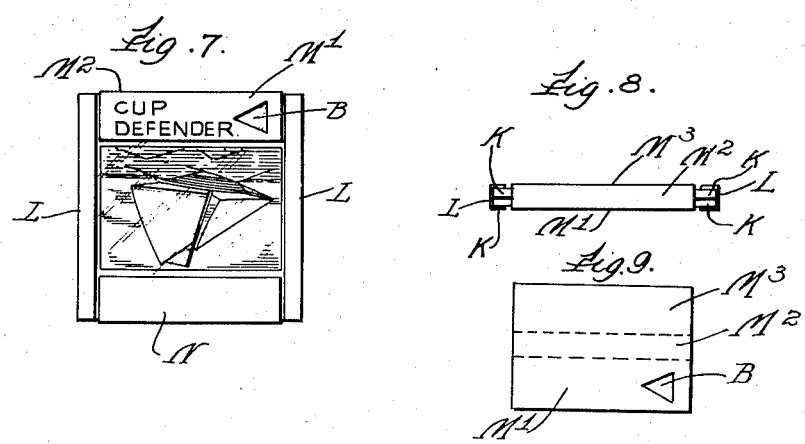
Inventor.
Albert W. Engel.
by [signature]
his Attorneys
Witness.
N. T. McKnight Patented July 11, 1939

2,165,790

UNITED STATES PATENT OFFICE 2,165,790

LABEL AND MARKER FOR LANTERN SLIDES

Albert W. Engel, Chicago, Ill.

Application August 15, 1938, Serial No. 224,867

6 Claims. (Cl. 40—2)

This invention relates to lantern slides or transparencies designed to be used in a projector for throwing an enlarged image on a screen; and its purpose is to provide a marking expedient which will enable the operator of the projector to place the slide in the proper position therein without inspecting the transparency itself. Another object of the invention is to combine the marker with a label adapted to carry a title or other data applicable to the particular slide to which it is attached. The invention consists of certain features and elements of construction in combination as herein shown and described and as indicated by the claims.

In the drawings:

Figure 1 is a face view of a blank label including the marking feature of this invention.

Figure 2 shows the label applied to a slide in which the picture area is oblong and extends vertically.

Figure 3 shows the label applied to a slide in which the picture area is oblong and extends horizontally.

Figure 4 illustrates the mode of use of the invention, showing the proper method of grasping the slide preparatory to inserting it in the projecting machine.

Figure 5 is a face view of a label having a modified form of marking feature.

Figure 6 is a section at line 6—6 on Figure 1.

Figure 7 is a view similar to Figure 3, but showing the label serving also as a binding strip for the slide.

Figure 8 is an end elevation or edge view of the slide shown in Figure 7.

Figure 9 is a face view of a combined label and binding strip.

As will be readily understood by those familiar with the subject of optics, the usual stereopticon or projector employed for producing an enlarged luminous image on a screen by projecting light through a relatively small transparent picture has the effect of inverting the picture and transposing it from right to left, so that the image projected on the screen is the reverse of that which is seen by viewing the transparency alone from the side at which the projecting light approaches it. This tends to be somewhat confusing to the operator of the projetcor, or, at least, it requires him ordinarily to inspect each transparency carefully before placing it in the projector, since he must position it in inverted and reverse relation in order to insure that the image projected on the screen shall be a correct representation of the subject.

At present, a standard form of slide employed for this purpose, particularly for projecting transparencies made from small camera negatives, is square in outline, although the standard form of sight opening within the square area of the slide is oblong. Some views may be taken so that the longer dimension of the oblong form is vertical, while other views may be arranged horizontally with respect to the oblong, and this adds a further complication in placing the slides in the projector.

The present invention provides a label such as that shown at A, in Figure 1, which is preferably made of paper or like sheet material, and gummed on one side for ready attachment to the surface of the cover glass of a lantern slide. The label provides a generous area $A^1$ for a written or printed title or other data respecting the picture to which it is applied, and near one end it is formed with an operture B. It is only necessary that in applying the label to the slide it be attached in such a position that the aperture B is adjacent the upper right-hand corner of the slide as viewed from the side toward the source of light in the projecting machine, which is the side from which the operator of the projector normally sees the slide as he places it in the machine.

Figure 2 illustrates a slide C of the standard proportions already mentioned, in which the external outline is square, while the outline of the picture area D formed by the "sight opening" $E^1$ of the mask E is oblong, and in this particular instance the oblong area extends vertically. This leaves wider margins of the mask at the sides of the picture area D than at the top and bottom; hence, it is more convenient to apply the label A at one side, with its operture B in the upper right-hand corner of the slide, as seen in Figure 2.

Figure 3 shows a slide G whose mask F is so placed that the oblong picture area H produced by the sight opening $F^1$ of the mask extends horizontally; this brings the wider margins of the mask F at the top and bottom of the slide, leaving a convenient space at the top for the application of the label A with its marking aperture B in the upper right-hand corner of the slide G. Figure 4 illustrates the method of grasping a slide by its upper right-hand corner, placing the thumb substantially over the marking aperture B, so as to insure insertion of the slide in the projecting machine (not shown) in the proper position. It will be understood that, if desired, the marker B may be merely printed on the label in a contrasting color; but if the label itself be of a color contrasting with that of the mask E then the marker is quite conveniently formed as an aperture, as already described, and the contrasting color of the mask E showing through the aperture B will make it readily discernible, even in a dim light. The label A may be applied directly to the mask E, so as to be included between the cover glasses of the slide, if desired, but, particularly when the marker B is in the form of an aperture, there is an advantage in securing the label to the outer surface of the slide so that in the comparative darkness which usually prevails during the use of a projector, the marker B may be tactually discernible as the thumb or finger contacts with the edge of the marking aperture.

Figure 1 shows the marking aperture B as of triangular form, with the vertex of one angle pointing toward the opposite end of the label A. But, if desired, the marker may have some other shape, such as the circular shape shown at B¹ in Figure 5.

The usual structure of the lantern slide for which this label is intended includes two squares of transparent glass, one of which may carry the transparency directly on its inner surface, protected by the other glass, although, more commonly, the transparency is in the form of a photographic film secured between the two glasses and framed by a mask of paper or the like, also included between the glass elements. In the drawing each of the glass members of the slide is designated as K, and Figures 2, 3, 4 and 7 show portions of the binding strips L, by which the glass elements K are permanently held together, face to face, with the transparency disposed between them. Figures 7 and 8 illustrate a slide in which a modified form of label M serves as an additional binder for securing the two glass elements K, K together. As shown in Figure 9 the label blank includes the label area M¹ with the marker aperture B therein, and an adjacent area M² which fits around the edge of the slide, while a third area M³ is adapted to overlie the opposite outer face of the slide, and to be adhesively secured thereto. Preferably, in all forms, the label is gummed on one surface for ready attachment either to the mask or to the glass of the lantern slide. If desired, an additional binder N similar in shape to the label M but without any aperture, may be applied to the fourth side of the slide, as shown in Figure 7. Preferably, the label M and the binder N will be made slightly shorter than the side of the slide so as not to overlap the binders L, L; thus, while all four edges of the glass will be covered, the portions adjacent the corners and just beyond the ends of the binders M and N will be exposed and may be arranged to provide for a limited circulation or air between the glasses K, K.

I claim:

1. In a lantern slide of substantially square outline and including a mask having a sight opening of oblong shape symmetrically disposed within said outline, a label applied over said mask along one longer side of the sight opening, said label being of a color contrasting with that of the mask and having an aperture near one end to provide a signal marking through which the contrasting color of the mask is visible for indicating the proper positioning of the slide when inserted in a projector.

2. In a lantern slide of substantially square outline having a sight opening of oblong shape symmetrically disposed within said outline, a label applied to the outer surface of the slide extending along one longer side of the sight opening and having a signal marking near one end formed so as to be tactually discernible for indicating the proper positoning of the slide when inserted in a projector.

3. In a lantern slide which includes the two layers of glass supporting a transparency and a mask having a sight opening, a label applied adhesively to the outer face of one layer of glass over an area adjacent the sight opening of the mask, said label being apertured near one end to provide a signal marking which is thus located adjacent one corner of the slide for indicating its proper positioning when inserted in a projector, said label having also a portion which extends around the adjacent edge of the slide and onto the outer face of the other layer of glass in adhesive engagement therewith.

4. In a lantern slide, a label applied to the outer surface of the slide and having a tactually discernible marking disposed near one end of the label and located adjacent one corner of the slide for indicating the proper positioning of the latter when inserted in a projector.

5. In a lantern slide which includes a mask having a sight opening providing a marginal area adjacent one edge of the slide, a label applied over said marginal area, said label being of a color contrasting with that of the mask and having an aperture disposed near one end and thus located adjacent one corner of the slide for indicating its proper positioning when inserted in a projector.

6. In a lantern slide, a label applied to the outer surface of the slide and having an aperture disposed near one end of the label and located adjacent one corner of the slide to constitute a tactually discernible marking for indicating the proper positioning of the slide when inserted in a projector.

ALBERT W. ENGEL.